US009558208B1

(12) United States Patent
Faibish et al.

(10) Patent No.: US 9,558,208 B1
(45) Date of Patent: Jan. 31, 2017

(54) CLUSTER FILE SYSTEM COMPRISING VIRTUAL FILE SYSTEM HAVING CORRESPONDING METADATA SERVER

(71) Applicant: EMC Corporation, Hopkinton, MA (US)

(72) Inventors: Sorin Faibish, Newton, MA (US); John M. Bent, Los Alamos, NM (US); James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 527 days.

(21) Appl. No.: 14/134,773

(22) Filed: Dec. 19, 2013

(51) Int. Cl.
G06F 17/30 (2006.01)
(52) U.S. Cl.
CPC .............................. G06F 17/30233 (2013.01)
(58) Field of Classification Search
None
See application file for complete search history.

(56) References Cited

U.S. PATENT DOCUMENTS

| 7,103,638 B1* | 9/2006 | Borthakur ......... G06F 17/30067 707/999.202 |
| 2007/0011422 A1* | 1/2007 | Srinivasan ........ G06F 17/30244 711/165 |
| 2009/0216796 A1* | 8/2009 | Slik ..................... G06F 17/3012 |
| 2010/0161657 A1* | 6/2010 | Cha .................. G06F 17/30094 707/770 |
| 2011/0066668 A1* | 3/2011 | Guarraci ........... G06F 17/30233 707/831 |
| 2013/0191354 A1* | 7/2013 | Wilf .................. G06F 17/30289 707/694 |
| 2014/0310455 A1* | 10/2014 | Baldwin ............... G06F 3/0641 711/114 |

OTHER PUBLICATIONS

J. Bent et al., "PLFS: A Checkpoint Filesystem for Parallel Applications," ACM Proceedings of the Conference on High Performance Computing Networking, Storage and Analysis (SC09), Nov. 2009, pp. 1-12.
Cluster File Systems, Inc., "Lustre: A Scalable, High-Performance File System," Nov. 2002, pp. 1-13.
(Continued)

Primary Examiner — Son T Hoang
(74) Attorney, Agent, or Firm — Ryan, Mason & Lewis, LLP

(57) ABSTRACT

A cluster file system comprises a physical file system that includes multiple storage tiers, a virtual file system configured to provide an interface between the physical file system and multiple clients, and a metadata server associated with the virtual file system. The virtual file system receives files from each of one or more of the clients and arranges the files into objects for object-based storage in the storage tiers of the physical file system. The virtual file system also controls movement of the objects between the storage tiers. The metadata server stores information indicating for each of the objects the corresponding storage tier of the physical file system that currently stores that object. In some embodiments, the virtual file system comprises a parallel log-structured file system (PLFS) and arranging the files into objects comprises associating multiple ones of the files with a single PLFS object.

20 Claims, 6 Drawing Sheets

(56) References Cited

OTHER PUBLICATIONS

F. Wang et al., "Understanding Lustre Filesystem Internals," National Center for Computational Sciences, Tech Report ORNL/TM-2009/117, Apr. 2009, pp. 1-80.

U.S. Appl. No. 13/728,421 filed in the name of S. Faibish et al. on Dec. 27, 2012 and entitled "Burst Buffer Appliance Comprising Multiple Virtual Machines."

* cited by examiner

CLUSTER FILE SYSTEM COMPRISING VIRTUAL FILE SYSTEM HAVING CORRESPONDING METADATA SERVER

FIELD

The field relates generally to information processing systems, and more particularly to information processing systems that incorporate cluster file systems.

BACKGROUND

It is common in high-performance computing (HPC) systems and other information processing systems for multiple compute nodes to access a cluster file system. For example, HPC systems such as supercomputers typically include large numbers of compute nodes that access a parallel file system, distributed file system or other type of cluster file system. A cluster file system as the term is broadly used herein generally allows multiple compute nodes or other types of clients to share access to files over a network.

One well-known cluster file system is the Lustre file system. Lustre is a Linux-based high performance cluster file system utilized for computer clusters ranging in size from small workgroup clusters to large-scale, multi-site clusters. Lustre can readily scale to support tens of thousands of clients, petabytes of storage capacity, and hundreds of gigabytes per second of aggregate input-output (IO) throughput. Due to its high performance and scalability, Lustre is utilized in many supercomputers, as well as other complex computing environments, including large enterprise data centers.

In conventional Lustre implementations, it can be difficult to balance the conflicting requirements of storage capacity and IO throughput. IO operations on object storage servers are generally performed directly with back-end storage arrays associated with those servers, and the corresponding storage devices may not be well matched to the current needs of the system. This can lead to situations in which either performance is less than optimal or the costs of implementing the system become excessive.

Accordingly, despite the many advantages of Lustre file systems and other similar cluster file systems, a need remains for additional improvements, particularly with regard to IO operations. For example, further acceleration of IO operations, leading to enhanced system performance relative to conventional arrangements, would be desirable. Additionally or alternatively, an ability to achieve particular levels of performance at lower cost would be advantageous.

SUMMARY

Illustrative embodiments of the present invention provide techniques for implementing a cluster file system using a virtual file system having a corresponding metadata server. The virtual file system interfaces compute nodes or other clients of a computer system with an underlying physical file system that illustratively comprises multiple storage tiers including at least one burst buffer tier implemented utilizing burst buffers of at least one burst buffer appliance and at least one object storage server tier. The resulting arrangements allow a cluster file system to be configured in a particularly efficient manner utilizing any type of underlying physical file system, thereby permitting acceleration of IO operations, leading to enhanced system performance relative to conventional arrangements, while also providing an ability to achieve particular levels of performance at lower cost.

In one embodiment, a cluster file system comprises a physical file system that includes multiple storage tiers, a virtual file system configured to provide an interface between the physical file system and multiple clients, and a metadata server associated with the virtual file system. The virtual file system receives files from each of one or more of the clients and arranges the files into objects for object-based storage in the storage tiers of the physical file system. The virtual file system also controls movement of the objects between the storage tiers. The metadata server stores information indicating for each of the objects the corresponding storage tier of the physical file system that currently stores that object.

By way of example, the virtual file system may comprise a parallel log-structured file system (PLFS) and arranging the files into objects may comprise associating multiple ones of the files with a single PLFS object.

Other embodiments include without limitation methods, apparatus, systems, and articles of manufacture comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising physical or virtual processing resources in any combination.

Figure 1:
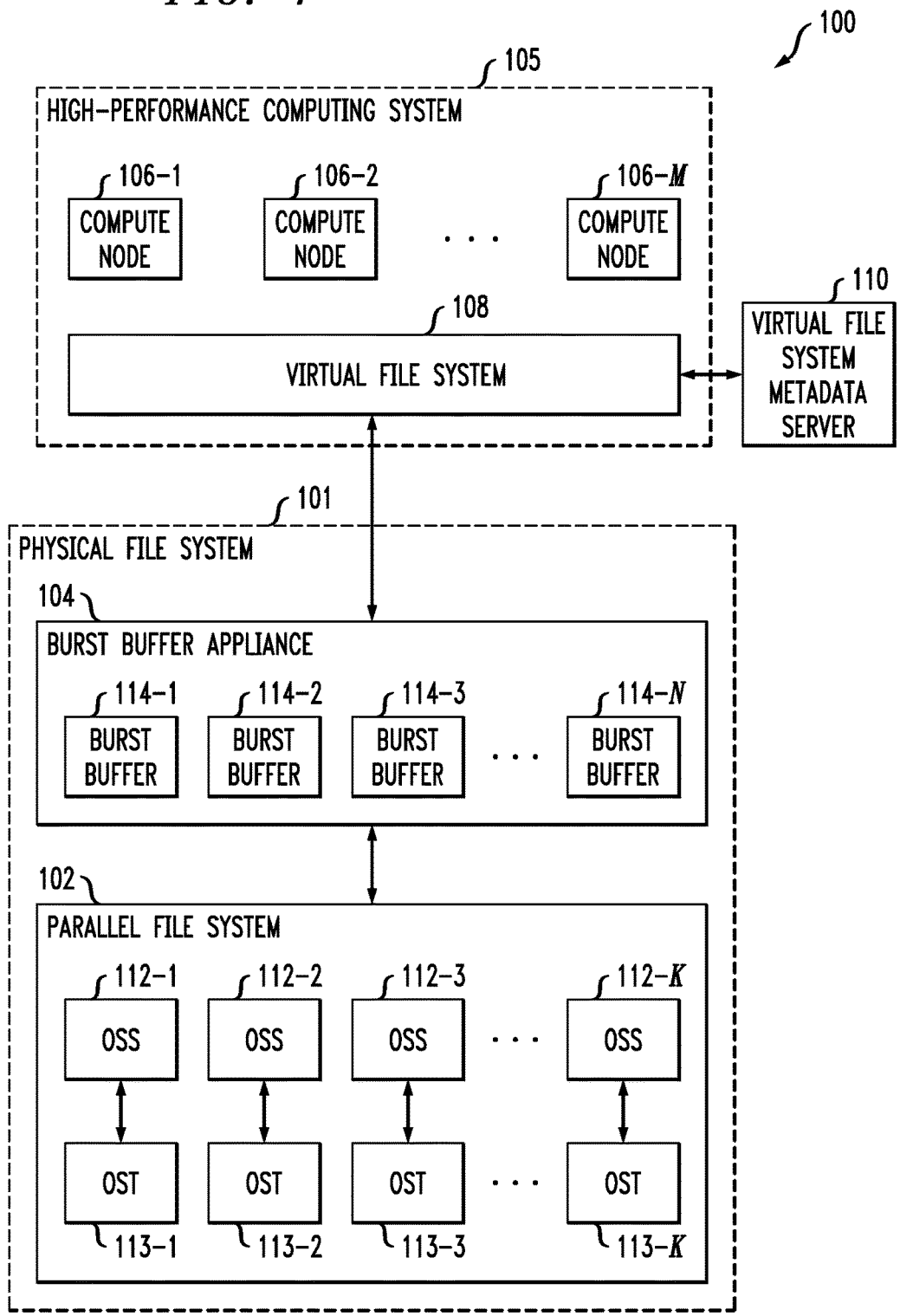
FIG. 1 is a block diagram of an information processing system incorporating a cluster file system comprising a virtual file system and a corresponding metadata server in an illustrative embodiment of the invention.

FIG. 1 shows an information processing system 100 configured in accordance with an illustrative embodiment of the present invention. The information processing system 100 comprises a physical file system 101 that includes multiple storage tiers illustratively comprising at least one object storage server or OSS tier implemented in a parallel file system 102 and at least one burst buffer tier implemented in a burst buffer appliance 104. This particular tiering arrangement is exemplary only, and numerous alternative arrangements of two or more storage tiers may be implemented in the physical file system 101 in other embodiments. For example, in other embodiments, the burst buffer appliance 104 may be eliminated, with the multiple storage tiers of the physical file system 101 being implemented using different object storage server tiers in the parallel file system 102.

The information processing system 100 further comprises an HPC system 105 comprising a plurality of compute nodes 106-1, 106-2, . . . 106-M. The HPC system 105 may comprise, for example, a supercomputer. Such an HPC system is an example of what is more generally referred to herein as a "computer system."

Also included in the information processing system 100 is a virtual file system 108 and a virtual file system metadata server 110. The virtual file system 108 is configured to provide an interface between the physical file system 101 and a plurality of clients illustratively comprising respective ones of the compute nodes 106 or various components thereof. The term "client" as used herein is therefore intended to be broadly construed, so as to encompass, for example, a compute node or a component thereof. Such a component may be implemented in software, and therefore a "client" as the term is utilized herein may comprise a software component associated with one of the compute nodes 106. For example, a client may comprise an application running on a given one of the compute nodes 106.

Although illustratively shown as being implemented within the HPC system 105 in the present embodiment, the virtual file system 108 in other embodiments may be implemented at least in part on other system components.

The virtual file system 108 receives files from each of one or more of the clients and arranges those files into objects for object-based storage in the storage tiers of the physical file system 101. The virtual file system 108 in the present embodiment is also configured to perform additional storage-related functions, such as arranging retrieved objects into corresponding files for delivery to requesting clients, and controlling movement of objects between the storage tiers of the physical file system 101 in order to facilitate achievement of desired levels of performance by the clients.

The metadata server 110 stores information indicating for each of the objects at least the corresponding storage tier of the physical file system 101 that currently stores that object. Additional or alternative types of metadata associated with object-based storage in the physical file system may also be maintained by the metadata server 110 under the control of the virtual file system 108.

By way of example, the information stored by the metadata server 110 for a given one of the objects illustratively comprises a pointer to the particular storage tier that currently stores that object. Additionally or alternatively, the information stored by the metadata server 110 for a given one of the objects may comprise a hyperlink. When such a hyperlink is activated by a corresponding one of the clients, the client is directed to the particular storage tier that currently stores that object. Numerous other types of pointers, hyperlinks and other information used to facilitate object-based storage in the physical file system 101 may be stored in the virtual file system metadata server 110.

Although only a single metadata server 110 is shown in the FIG. 1 embodiment, it should be understood that the metadata server 110 in some embodiments is replicated as multiple metadata server instances in order to provide enhanced accessibility as well as protection against metadata server failures.

The burst buffer appliance 104 is illustratively shown as being coupled between the parallel file system 102 and the HPC system 105 comprising compute nodes 106. The parallel file system 102 is assumed by way of example to comprise multiple distinct file systems arranged in parallel with one another.

In the present embodiment, the physical file system 101, virtual file system 108 and associated metadata server 110 collectively provide an exemplary implementation of what is more generally referred to herein as a cluster file system. At least portions of such a cluster file system may illustratively comprise a Lustre file system. Conventional aspects of Lustre file systems are described in, for example, Cluster File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein.

Alternatively, portions of a cluster file system may be implemented as a distributed file system such as Hadoop Distributed File System (HDFS), or as a combination of a Lustre file system and an HDFS. The term "cluster file system" as used herein is therefore intended to be broadly construed, so as to encompass, for example, Lustre file systems, distributed file systems, parallel file systems, or various combinations thereof, as well as other types of file systems implemented using one or more clusters of processing devices.

Other embodiments may include multiple burst buffer appliances 104, with each such appliance adapted for coupling between at least a portion of the parallel file system 102 and one or more compute nodes 106 of the HPC system 105.

Numerous other types and arrangements of cluster file systems, burst buffer appliances and computer systems may be used in other embodiments of the invention.

As illustrated in the figure, the parallel file system 102 comprises a plurality of object storage servers or OSSs 112 having corresponding object storage targets or OSTs 113. These pairs of OSS and OST components are illustratively arranged in parallel with one another as shown in the figure. Although only a single OST is associated with each OSS in the FIG. 1 embodiment, this is for purposes of simplicity and clarity of illustration only, and other embodiments may associate multiple OSTs with each OSS.

The OSSs are more particularly denoted as OSSs 112-1, 112-2, 112-3 . . . 112-K, and the OSTs are more particularly denoted as OSTs 113-1, 113-2, 113-3, . . . 113-K. Although the OSTs 113 are shown as being external to the OSSs 112 in the FIG. 1 embodiment, in other embodiments an OST may be at least partially implemented within a corresponding OSS. It should therefore be appreciated that the term "object storage server" as used herein is intended to be broadly construed, and in other embodiments a given object storage server may incorporate one or more associated object storage targets.

Although not explicitly shown in FIG. 1, at least one metadata server or MDS and at least one metadata target or MDT may be associated with the parallel file system 102. A given such MDS utilizes one or more corresponding MDTs to provide metadata services for the parallel file system 102. The MDT stores file metadata, such as file names, directory structures, and access permissions.

The OSTs 113 and any MDT components of parallel file system 102 in given embodiment are illustratively implemented using one or more storage arrays. Such storage arrays may comprise, for example, storage products such as VNX® and Symmetrix VMAX®, both commercially available from EMC Corporation of Hopkinton, Mass. A variety of other storage products may be utilized to implement at least a portion of the OSTs 113 and any MDTs of the parallel file system 102.

The burst buffer appliance 104 includes a plurality of burst buffers 114, more particularly denoted as burst buffers 114-1, 114-2, 114-3, . . . 114-N. The burst buffers 114 may illustratively comprise respective flash servers. Such a flash server is assumed to be implemented using one or more flash storage devices, although other types of high-speed storage devices can additionally or alternatively be used.

As indicated above, the virtual file system 108 controls movement of objects between the storage tiers of the physical file system, taking into account current operating conditions and other factors. The parallel file system 102 and burst buffer appliance 104 may be viewed as representing respective distinct storage tiers of the system 100. Additionally or alternatively, multiple storage tiers may be implemented within the parallel file system 102. For example, the parallel file system 102 may itself include multiple distinct storage tiers, possibly including a first storage tier implemented using flash servers or other high-speed storage devices and one or more additional lower storage tiers implemented using disk storage devices. In other embodiments an "object storage server" as the term is broadly used herein may be viewed as incorporating at least a portion of one or more associated object storage targets.

Data object movement determinations made by the virtual file system 108 are illustratively performed in cooperation with one or more job schedulers of the information processing system 100. For example, data object movement determinations can be made at least in part utilizing a job scheduler of the system 100 responsive to IO requests received in the job scheduler from one or more applications running on the compute nodes 106. Such IO requests and other similar requests referred to herein may be configured, for example, in accordance with standard portable operating system interface (POSIX) system calls. Object movement determinations can be implemented differently for each of a plurality of processing jobs, thereby effectively allowing dynamic object migration on a per-job basis.

The virtual file system 108 updates the metadata stored in the metadata server 110 responsive to object movement between the storage tiers of the physical file system 101.

Although the metadata server 110 is shown in the present embodiment as being external to the parallel file system 102, the burst buffer appliance 104 and the HPC system 105, in other embodiments at least portions of the metadata server 110 may be implemented in one or more of the parallel file system 102, the burst buffer appliance 104 and the HPC system 105. Thus, for example, the metadata server 110 may be wholly or partially incorporated in one of the parallel file system 102, the burst buffer appliance 104, or the IJPC system 105, or implemented in a distributed manner using multiple ones of those system components. It is also possible for the metadata server 110 to be implemented on a separate processing device that is associated with a processing platform that comprises at least portions of the at least one of the parallel file system 102, the burst buffer appliance 104 and the HPC system 105. Numerous other types and arrangements of hardware, software and firmware on one or more processing devices may be used to implement a controller in other embodiments. The term "metadata server" as used herein is therefore intended to be broadly construed.

At least one of the storage tiers of the physical file system 101 is referred to herein as a high-speed storage tier in that it comprises storage devices that are assumed to have a substantially lower access time than disk storage devices that are utilized for at least a subset of the OSTs 113 of the parallel file system 102. Terms such as "high-speed" and "low-speed" as used herein with reference to a given storage tier or storage devices thereof are relative terms that are intended to be broadly construed, and do not require any particular absolute level of operating speed.

By way of example, the storage devices of a high-speed storage tier may comprise respective flash Peripheral Component Interconnect express (PCIe) cards, although numerous other types of storage devices that exhibit low access times relative to typical disk storage devices may be used. Thus, other types of low-latency memory could be used instead of or in combination with flash memory in other embodiments. Typically, such low-latency memories comprise electronic memories, which may be implemented using non-volatile memories, volatile memories or combinations of non-volatile and volatile memories. More particular examples of alternatives to flash storage devices that may be used in other embodiments of the invention include non-volatile memories such as magnetic random access memory (MRAM) and phase change random access memory (PC-RAM).

It is to be appreciated that the configuration of the burst buffer appliance 104 as illustrated in FIG. 1 is exemplary only. For example, the burst buffer appliance 104 may comprise other types of components not explicitly shown, such as one or more analytics engines. It is also possible in some embodiments for the burst buffer appliance 104 to implement at least portions of the virtual file system 108.

The virtual file system 108 in the present embodiment is assumed to be implemented using a parallel log-structured file system (PLFS), although other types of virtual file systems may be used in other embodiments.

Additional details regarding PLFS can be found in J. Bent et al., "PLFS: A Checkpoint Filesystem for Parallel Applications," ACM/IEEE Conference on High Performance Computing Networking, Storage and Analysis, SC09, Portland, Oreg., Nov. 14-20, 2009, pp. 1-12, which is incorporated by reference herein. It is to be appreciated, however, that PLFS is not a requirement of any particular embodiment.

As indicated previously, although only a single burst buffer appliance 104 is associated with all of the compute nodes 106 in this embodiment, in other embodiments there may be multiple instances of the burst buffer appliance 104. For example, each compute node or each of other subsets of the compute nodes 106 may have a separate instance of the burst buffer appliance 104 associated therewith. Thus, in some embodiments, a given burst buffer appliance may be coupled between a single compute node and the parallel file system 102. The term "computer system" as broadly used herein should therefore also be understood to encompass an arrangement involving only a single compute node.

The burst buffer appliance 104 may receive data from a variety of sources other than the compute nodes 106, although such other sources are not explicitly shown in the figure. For example, the burst buffer appliance may receive data files comprising sensor data received from sensor networks. It is to be appreciated that a wide variety of additional or alternative data sources may provide data to the burst buffer appliance 104 for storage in the parallel file system 102 in other embodiments.

The burst buffer appliance 104 is generally configured to accelerate IO operations between the compute nodes 106 and the parallel file system 102 by storing associated data in its burst buffers 114.

By way of example, the burst buffer appliance 104 in the present embodiment may be configured to enhance the IO throughput performance of the information processing system 100 by supporting fast checkpointing of one or more compute nodes 106. More particularly, the compute nodes 106 can write data files comprising checkpoint data to the burst buffers 114 at very high speeds, and that checkpoint data is later written at a much slower rate from the burst buffers to the parallel file system 102. This ensures that other operations of the compute nodes 106 are not unduly delayed by the writing of checkpoint data while also allowing the system 100 to continue to utilize the parallel file system 102.

It is also possible that the burst buffer appliance 104 may include multiple virtual machines that facilitate prioritization of checkpoints as well as coordination of priorities for other types of IO operations that involve utilization of the burst buffers 114 of the burst buffer appliance. For example, different virtual machines of the burst buffer appliance may be used to process different types of data files, such as data files comprising checkpoint data and data files comprising sensor data. Such an arrangement permits different IO throughput performance levels to be provided for the different types of data files. The particular number of virtual machines implemented in the burst buffer appliance 104 may be varied, as well as the types of IO operations that are subject to virtual machine control. Additional details regarding such functionality can be found in U.S. patent application Ser. No. 13/728,421, filed Dec. 27, 2012 and entitled "Burst Buffer Appliance Comprising Multiple Virtual Machines," which is commonly assigned herewith and incorporated by reference herein.

Accordingly, the term "burst buffer appliance" as used herein is intended to be broadly construed, so as to encompass any network appliance or other arrangement of hardware and associated software or firmware that collectively provides multiple burst buffers implemented using high-speed storage devices, supplemented in some embodiments by an analytics engine and possibly one or more virtual machines that control access to the high-speed storage devices for distinct types of IO operations. Thus, such an appliance includes a high-speed memory that may be viewed as serving as a buffer between a computer system comprising compute nodes 106 and a file system such as parallel file system 102, for storing bursts of data associated with different types of IO operations.

Communications between the parallel file system 102 and the burst buffer appliance 104, between the burst buffer appliance 104 and the compute nodes 106 via the virtual file system 108, and communications between the virtual file system 108 and the virtual file system metadata server 110, may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

At least portions of the parallel file system 102, burst buffer appliance 104, compute nodes 106, virtual file system 108 and virtual file system metadata server 110 may be implemented using one or more processing platforms, examples of which will be described in greater detail below in conjunction with FIGS. 6 and 7. A given such processing platform comprises at least one processing device comprising a processor coupled to a memory, and the processing device may be implemented at least in part utilizing one or more virtual machines.

Although shown in FIG. 1 as being separate from the parallel file system 102 and compute nodes 106, the burst buffer appliance 104 in other embodiments may be implemented at least in part within one or more of these system elements. It is also to be appreciated that a given embodiment of the information processing system 100 may include multiple instances of one or more of the parallel file system 102, the burst buffer appliance 104, the set of M compute nodes 106, the virtual file system 108 and the virtual file system metadata server 110, although only a single instance of each of these elements is shown in the system diagram for clarity and simplicity of illustration.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in greater detail with reference to the flow diagram of FIG. 2. The process as shown includes steps 200 through 210, and is suitable for use in the system 100 but is more generally applicable to other systems comprising a virtual file system providing an interface between a physical file system and a plurality of clients.

In step 200, a virtual file system is configured to provide an interface between a physical file system and plurality of clients. With reference to the FIG. 1 embodiment, the virtual file system 108 is implemented within the HPC system 105 comprising compute nodes 106 and illustratively may be implemented at least in part on the compute nodes 106 themselves, as in the embodiments to be described in conjunction with FIGS. 3, 4 and 5.

In step 202, files received from clients are arranged by the virtual file system into objects for object-based storage in storage tiers of physical file system. As noted above, the physical file system 101 in the FIG. 1 embodiment is assumed to comprise at least one high-speed storage tier implemented using flash storage devices. There is also at least one low-speed storage tier implemented using disk storage devices.

As one example, the burst buffer appliance 104 in the FIG. 1 embodiment may represent a high-speed storage tier implemented using flash storage devices, and the parallel file system 102 may represent a low-speed storage tier implemented using disk storage devices. Additionally or alternatively, the parallel file system 102 may itself comprise multiple storage tiers, including at least first and second storage tiers comprising respective disjoint subsets of a plurality of OSSs, with the OSSs in the first storage tier being configured to interface with OSTs of a first type and the OSSs in the second storage tier being configured to interface with OSTs of a second type different than the first type, and wherein the first and second different types of OSTs provide respective different levels of performance. More particularly, in such an arrangement, the OSTs of the first type may comprise respective flash storage devices and the OSTs of the second type may comprise respective disk storage devices. Again, numerous other storage tiering arrangements may be used in the physical file system 101.

The arrangement of files into objects in step 202 may involve, for example, associating multiple files with a single object.

As noted above, the virtual file system 108 may be implemented using PLFS and in such an embodiment arranging the files into objects may comprise associating multiple ones of the files with a single PLFS object.

In step 204, a metadata server associated with the virtual file system stores information indicating for each of the objects at least the corresponding storage tier of the physical file system that currently stores the object. This information may be supplemented by additional metadata characterizing the storage of the objects in the physical file system. In the FIG. 1 embodiment, such storage is performed in the metadata server 110 under the control of the virtual file system 108.

By way of example, the virtual file system 108 is implemented using PLFS, and an application running on the compute nodes 106 writes PLFS metadata to the metadata server 110 via PLFS clients of the compute nodes. The metadata may be written to the metadata server 110 in parallel with the writing of corresponding data files as objects to particular ones of the storage tiers of the physical file system 101. As mentioned elsewhere herein, the metadata may comprise a hyperlink to the data files. The data files can be stored either in the parallel file system 102 or in the burst buffer appliance 104, with the metadata hyperlink indicating the particular storage tier for a given object. Other types of information indicating the particular manner in which data files are stored as objects in the physical file system 101 may be stored as metadata in the metadata server 110.

In step 206, the virtual file system migrates objects between the storage tiers of the physical file system as necessary to facilitate achievement of desired performance. For example, in the FIG. 1 embodiment, the virtual file system 108 may migrate objects between the storage tiers of the physical file system 101 in order to achieve desired levels of IO performance responsive to requests received from one or more clients. Object migration and other object movement determinations may be based at least in part on monitoring of current levels of performance within the system 100. Such monitoring in the FIG. 1 embodiment is assumed to be performed under the direction of the virtual file system 108 and may involve the use of sensors of a sensor network of the type mentioned previously herein, or various other types of monitoring arrangements. The particular types of operating conditions and other factors that are monitored can be varied depending upon the needs of a given implementation.

The movement of a given one of the objects between first and second storage tiers may be controlled at least in part based on information provided by a client comprising an application running on a corresponding compute node.

In some embodiments, multiple data files associated with a given one of the objects moved from a first storage tier to a second storage tier can be made directly accessible within the second storage tier by a corresponding one of the clients without requiring interaction between the client and the first storage tier.

When PLFS is used to implement the virtual file system 108, the virtual file system may comprise PLFS middleware including multiple synchronization daemons associated with respective OSSs of at least one of the storage tiers, A given such synchronization daemon is triggered by at least one of a read operation and a write operation associated with a client comprising an application running on a corresponding compute node.

In step 208, the metadata server is updated to reflect any migration of objects that has taken place in step 206. In the FIG. 1 embodiment, the updating of the metadata server 110 to reflect current storage locations of the objects is assumed to be performed under the control of the virtual file system 108.

In step 210, a determination is made as to whether or not desired levels of performance have been achieved.

If the desired levels of performance have not been achieved, the process returns to step 206 in order to alter the manner in which the objects are stored across the storage tiers of the physical file system. In the context of the FIG. 1 embodiments, this generally involves the virtual file system 108 determining and implementing an alternative object storage arrangement, different than the current object storage arrangement, so as to facilitate achievement of the desired levels of performance in the system 100.

If the desired levels have been achieved, the process returns to step 202 in order to continue to process files received from the clients. The determination in step 210 is then repeated periodically and further adjustment of the manner in which the objects are distributed over the storage tiers is made in step 206 as needed, possibly in response to changing operating conditions and other factors.

Figure 2:
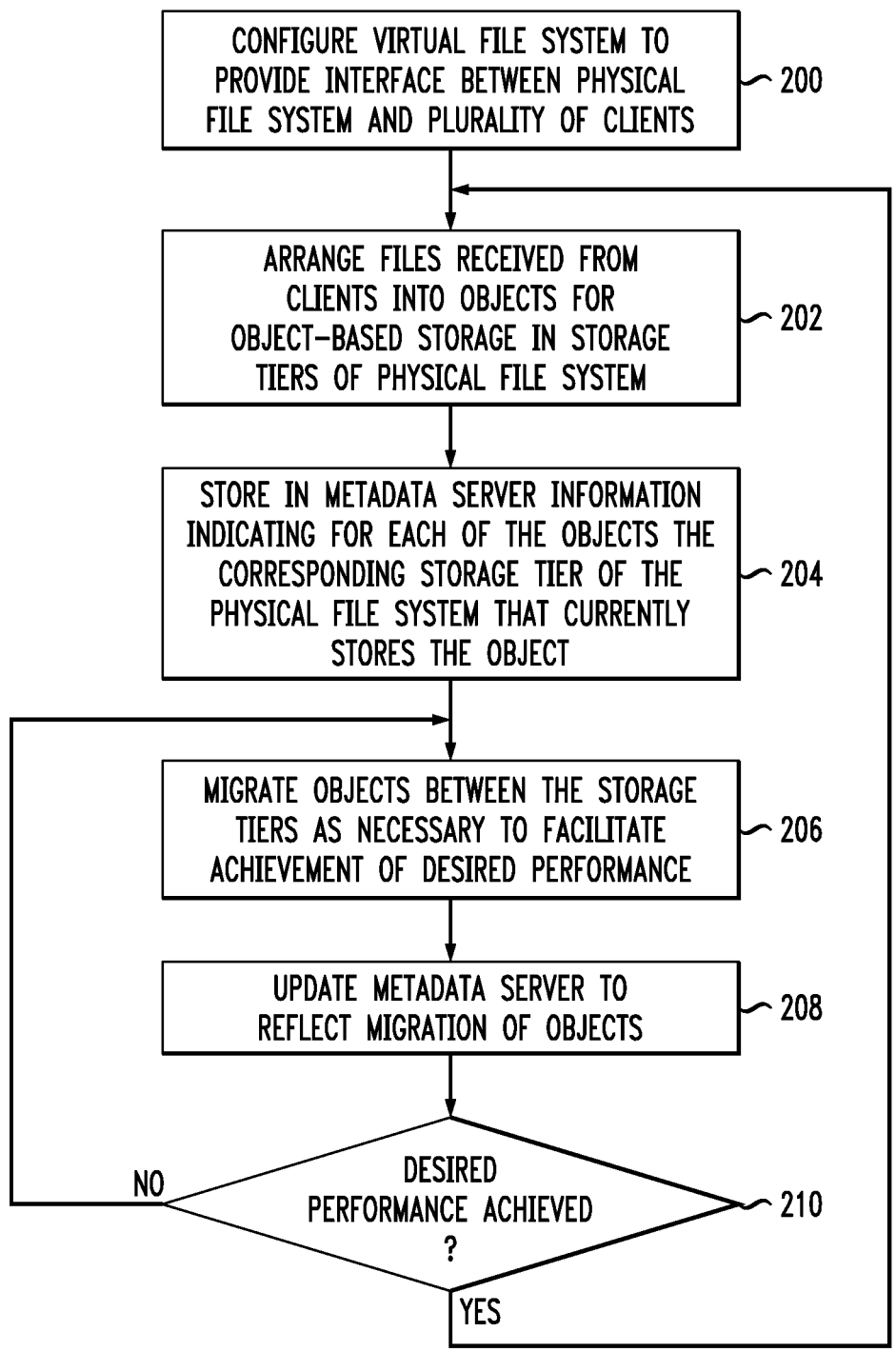
FIG. 2 is a flow diagram of an exemplary process implemented using the cluster file system in the information processing system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations using a virtual file system having an associated metadata server. For example, the ordering of the process steps may be varied in other embodiments, or certain steps may be performed concurrently with one another rather than serially. Also, one or more of the process steps may be repeated periodically for different processing applications, or performed in parallel with one another.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Exemplary multi-tier object-based storage functionality implemented in one or more embodiments of the invention will now be described in more detail with reference to FIGS. 3 to 5. In these embodiments, it is assumed that the compute nodes of the HPC system more particularly comprise compute nodes of a supercomputer, and further that the compute nodes run a simulation application, denoted in the figures as "Simulation."

Figure 3:
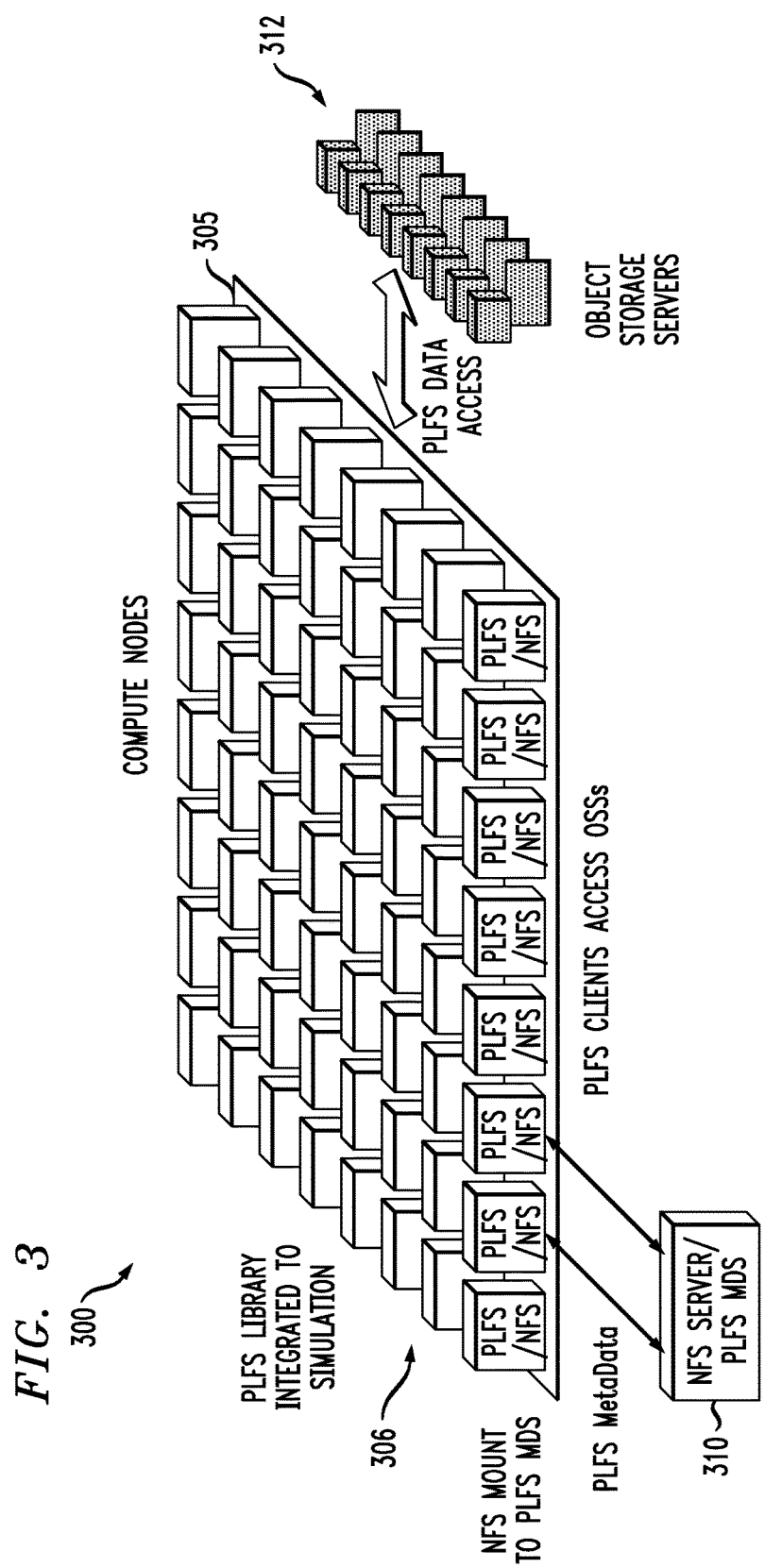
FIGS. 3, 4 and 5 illustrate different configurations of a cluster file system in another embodiment of an information processing system.
Figure 4:
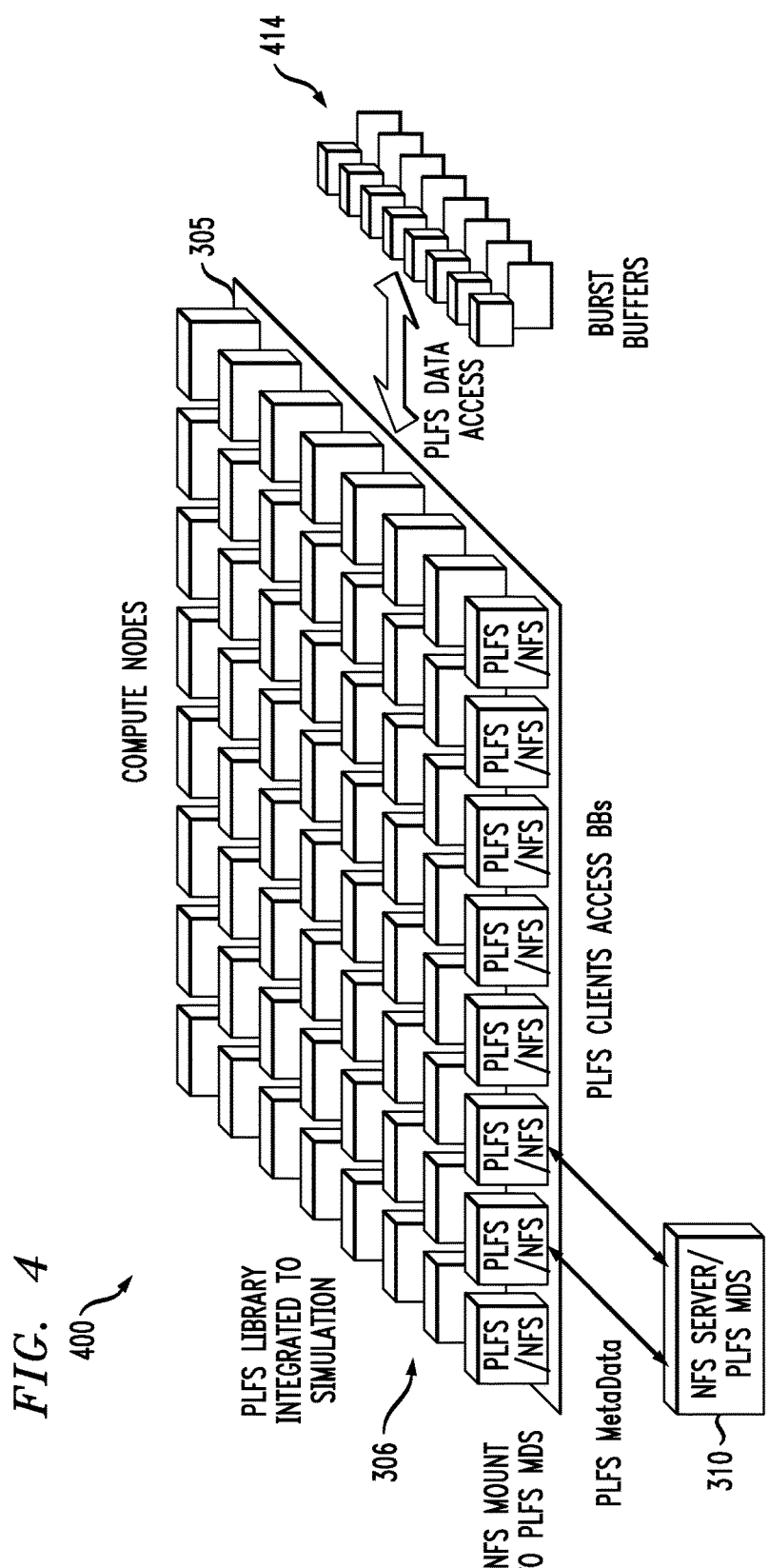
Figure 5:
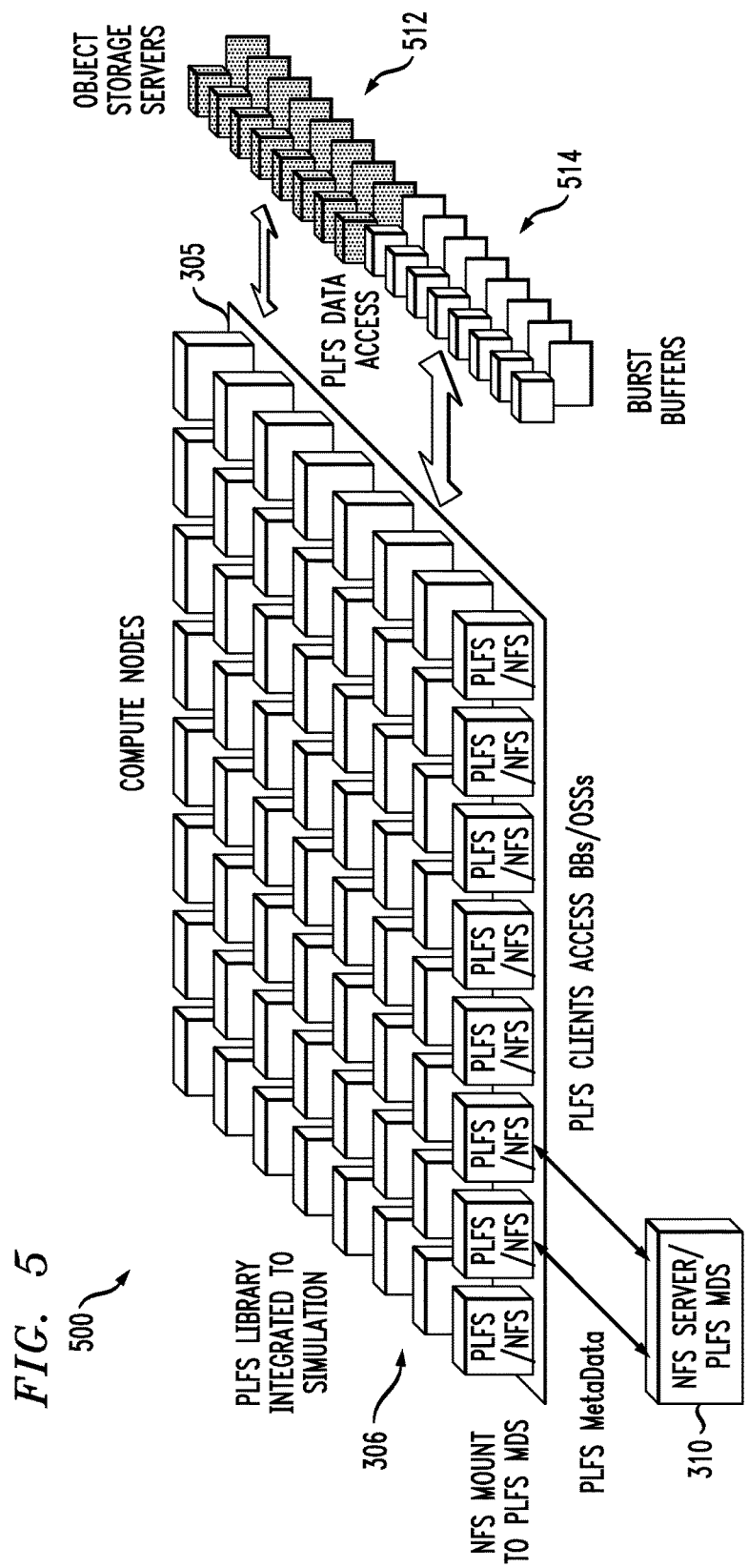

FIGS. 3, 4 and 5 more particularly show respective distinct system configurations corresponding to respective different storage arrangements within a given information processing system comprising a parallel file system or PFS implemented using a plurality of object storage servers and at least one burst buffer appliance implemented using a plurality of burst buffers. The parallel file system and one or more burst buffer appliances collectively provide a physical file system. The information processing system further comprises the supercomputer HPC system comprising multiple compute nodes. It is assumed that the HPC system implements a virtual file system utilizing PLFS, and that at least a subset of the compute nodes comprise PLFS clients associated with the PLFS virtual file system.

Referring initially to FIG. 3, the information processing system in a first configuration 300 includes an HPC system comprising a supercomputer fabric 305 that interconnects a plurality of compute nodes 306. The above-noted Simulation application running on the compute nodes 306 integrates a PLFS library and the compute nodes further include a network file system (NFS) mount to a PLFS metadata server or MDS 310. This is an example of an arrangement in which a virtual file system is implemented at least in part using PLFS components of the compute nodes of an HPC system.

The PLFS metadata server 310 is implemented in this embodiment as an NFS server. The PLFS components of the compute nodes 306 via the above-noted NFS mount can directly access the PLFS metadata server 310 in order to determine metadata indicating the manner in which particular files are stored as objects across multiple storage tiers of the physical file system, where the physical file system in the present embodiment is assumed to include at least one object storage server tier and at least one burst buffer tier.

As illustrated in FIG. 3, the compute nodes 306 utilize PLFS metadata server 310 to directly access multiple object storage servers 312 of an object storage tier provided by the parallel file system, thereby effectively bypassing the burst buffer tier in the configuration 300.

The configuration 300 is well suited for use in conjunction with those compute nodes that require only relatively slow IO performance.

FIG. 4 shows another configuration 400 of the information processing system. In this configuration, the compute nodes 306 utilize PLFS metadata server 310 to directly access multiple burst buffers 414 of one or more burst buffer appliances in the burst buffer tier.

Finally, in the configuration shown in FIG. 5, the compute nodes 306 utilize PLFS metadata server 310 to directly access multiple object storage servers 512 of an object storage tier of the parallel file system and multiple burst buffers 514 of one or more burst buffer appliances in the burst buffer tier.

In other embodiments, clients may be implemented at least in part utilizing an IO forwarding scalability layer (IOFSL) in place of or in addition to the exemplary PLFS clients described above.

Also, other embodiments could include in each of the compute nodes 306 separate PFS and PLFS clients for writing data to the PFS and for writing metadata to the PLFS metadata server, respectively. Additionally or alternatively, a separate NFS client may be used to implement the NFS mount for providing access to the external NFS server used for PLFS metadata server 310. The clients that interact with the virtual file system and portions of the underlying physical file system may therefore take on a wide variety of different configurations other than that illustrated in FIGS. 3-5.

The embodiments of FIGS. 3-5 may be viewed as exemplary arrangements in which a cluster file system is implemented using PLFS. The PLFS metadata server 310 serves as a metadata repository for PLFS objects that are written to the physical file system. The parallel file system implemented in the physical file system can be essentially any type of file system, including Lustre, NFS, GPFS, Ceph and numerous others. The PLFS metadata server 310 is illustrated implemented as an NFS server in FIGS. 3-5 but in other embodiments can be implemented as any network file server that can be mounted on the compute nodes that incorporate the PLFS clients. Again, numerous other arrangements can be used.

The configurations 300, 400 and 500 are examples of different object-based storage arrangements that are provided by a virtual file system having an associated virtual file system metadata server. Such arrangements allow particularly efficient access to multiple storage tiers of a given underlying physical file system.

By way of example, with reference to the embodiments of FIGS. 3-5, the simulation application running on the supercomputer compute nodes 306 can request a certain level of IO performance from a job scheduler implemented in or otherwise associated with the virtual file system. If the desired performance level cannot be achieved using a particular distribution of objects across storage tiers, the distribution of the objects across the storage tiers can be altered in order to improve the performance.

The disclosed arrangements can be used to construct a high-performance cluster file system using any underlying physical file system. Moreover, the use of a virtual file system metadata server such as metadata server 110 or metadata server 310 allows improved protection for stored data in the physical file system by facilitating recovery of such data in the presence of failures. For example, the metadata server allows the stored data to be recovered easily from an object archive.

Illustrative embodiments disclosed herein also make it possible to dynamically balance the conflicting requirements of storage capacity and IO throughput, thereby avoiding situations in which either performance is less than optimal or the costs of implementing the system become excessive. Arrangements of this type can provide further acceleration of IO operations in the system 100, leading to enhanced system performance relative to conventional arrangements, while additionally or alternatively providing an ability to achieve particular levels of performance at lower cost.

It is to be appreciated that the particular virtual storage system and virtual storage system metadata server arrangements illustrated in FIGS. 3, 4 and 5 are exemplary only, and numerous other arrangements may be used in other embodiments.

For example, the disclosed techniques may be adapted in a straightforward manner for providing efficient access to object-based storage distributed over more than two distinct storage tiers.

It was noted above that portions of the information processing system 100 may be implemented using one or more processing platforms. Illustrative embodiments of such platforms will now be described in greater detail. Although described in the context of system 100, these platforms may also be used to implement at least portions of the information processing system of configurations 300, 400 and 500 of FIGS. 3 through 5, as well as other embodiments of the invention.

Figure 6:
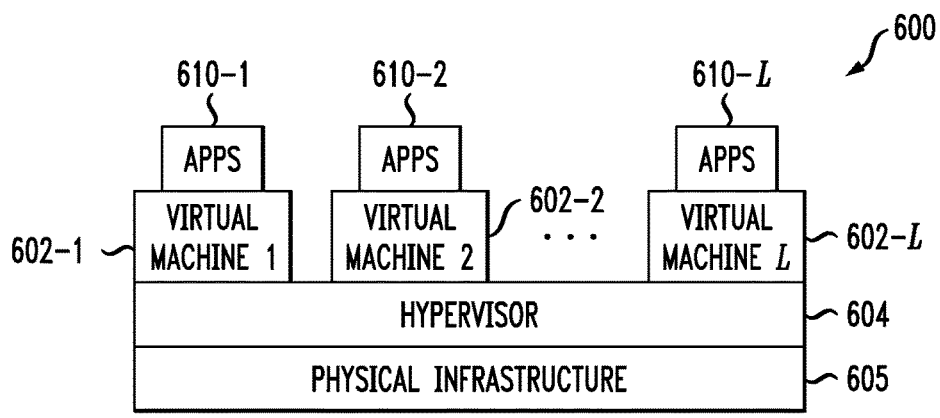
FIGS. 6 and 7 show examples of processing platforms that may be utilized to implement at least a portion of each of the information processing systems of FIGS. 1 and 3-5.
Figure 7:
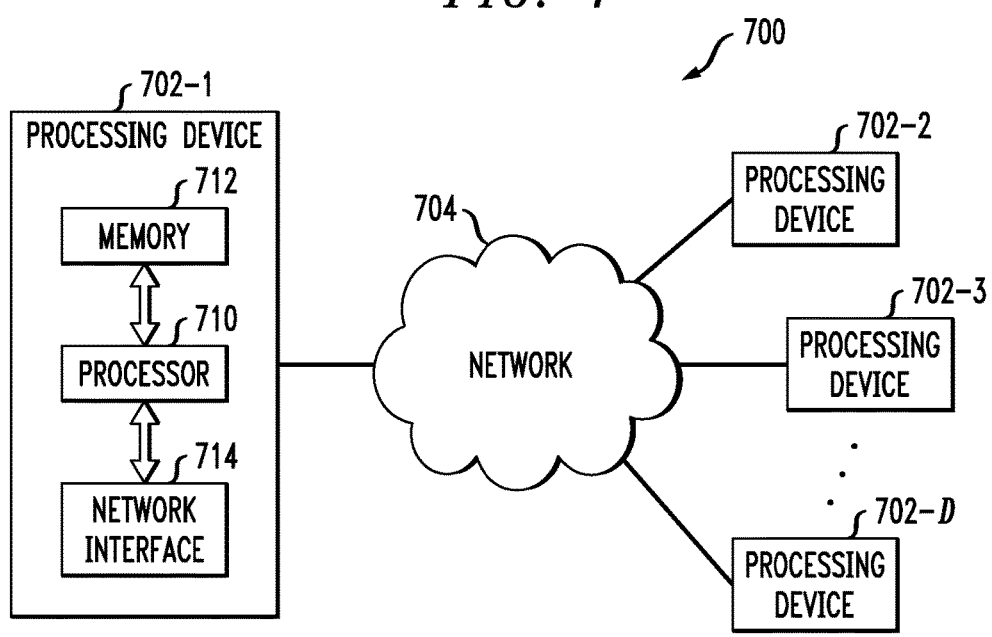

As shown in FIG. 6, portions of the information processing system 100 may comprise cloud infrastructure 600. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of the burst buffer appliance 104.

An example of a commercially available hypervisor platform that may be used to implement hypervisor 604 and possibly other portions of the information processing system 100 in one or more embodiments of the invention is the VMware® vSphere® which may have an associated virtual infrastructure management system such as the VMware® vCenter™, The underlying physical machines may comprise one or more distributed processing platforms that include storage products, such as the above-noted VNX® and Symmetrix VMAX®. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-D, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 722 may comprise random access memory (RAM), read-only memory (ROM) or other types of memory, in any combination. The memory 722 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of a cluster file system or burst buffer appliance as disclosed herein can be implemented at least in part in the form of one or more software programs stored in memory and executed by a processor of a processing device such as one of the virtual machines 602 or one of the processing devices 702.

It should again be emphasized that the above-described embodiments of the invention are presented for purposes of illustration only. Many variations and other alternative embodiments may be used. For example, the disclosed techniques are applicable to a wide variety of other types of information processing systems, virtual and physical file systems and computer systems that can benefit from the performance advantages associated with use of a virtual file system metadata server to facilitate access to object-based storage over multiple storage tiers. Also, the particular configurations of system and device elements shown in FIGS. 1 and 3-7 can be varied in other embodiments. Thus, for example, the particular type of virtual file system and parallel file system deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
    a physical file system comprising a plurality of storage tiers;
    a virtual file system configured to provide an interface between the physical file system and a plurality of clients of a computer system; and
    a metadata server associated with the virtual file system;
    the virtual file system comprising a plurality of virtual file system components implemented on respective ones of a plurality of compute nodes associated with the plurality of clients;
    wherein the virtual file system receives a plurality of files from each of one or more of the plurality of clients and arranges the received plurality of files into objects for object-based storage in the plurality of storage tiers of the physical file system;
    wherein the arranging of the files into objects comprises associating multiple ones of the received plurality of files with a single object of the virtual file system;
    wherein the virtual file system controls movement of the objects between the plurality of storage tiers of the physical file system;

wherein the metadata server stores metadata information indicating, for each of the objects, a corresponding storage tier of the physical file system that currently stores the object; and wherein the metadata server comprises a network file server external to the virtual file system and each of at least a subset of the plurality of compute nodes incorporates a network file server mount configured to allow each compute node of the subset to access metadata stored on the network file server.

2. The apparatus of claim 1, wherein the plurality of clients correspond to respective applications running on at least the subset of the plurality of compute nodes of the computer system.

3. The apparatus of claim 1, wherein the plurality of storage tiers comprises at least one burst buffer tier and at least one object storage server tier.

4. The apparatus of claim 1, wherein the plurality of storage tiers comprises at least first and second storage tiers comprising respective disjoint subsets of a plurality of object storage servers, with the object storage servers in the first storage tier being configured to interface with object storage targets of a first type and the object storage servers in the second storage tier being configured to interface with object storage targets of a second type different than the first type, and wherein the first and second different types of the object storage targets provide respective different levels of performance.

5. The apparatus of claim 4, wherein the object storage targets of the first type comprise respective flash storage devices and the object storage targets of the second type comprise respective disk storage devices.

6. The apparatus of claim 4, wherein movement of a given one of the objects between the first and second storage tiers is controlled at least in part based on information provided by a client comprising an application running on a corresponding one of the plurality of compute nodes.

7. The apparatus of claim 1, wherein the network file server comprises a network file system (NFS) server.

8. The apparatus of claim 1, wherein multiple data files associated with a given one of the objects moved from a first storage tier to a second storage tier are directly accessible within the second storage tier by a corresponding one of the plurality of clients without requiring interaction between the corresponding client and the first storage tier.

9. The apparatus of claim 1, wherein the virtual file system comprises a parallel log-structured file system (PLFS) comprising PLFS clients implemented on respective ones of the plurality of compute nodes and the arranging of the files into objects comprises associating multiple ones of the received plurality of files with a single PLFS object.

10. The apparatus of claim 9, wherein the PLFS comprises middleware including a plurality of synchronization daemons associated with respective object storage servers of at least one of the plurality of storage tiers.

11. The apparatus of claim 10, wherein a given one of the synchronization daemons is triggered by at least one of a read operation and a write operation associated with a client comprising an application running on a corresponding one of the plurality of compute nodes.

12. The apparatus of claim 1, wherein the information stored by the metadata server for a given one of the objects comprises a pointer to the particular storage tier that currently stores the given object.

13. The apparatus of claim 1, wherein the information stored by the metadata server for a given one of the objects comprises a hyperlink which when activated by a corresponding one of the plurality of clients directs the corresponding client to the particular storage tier that currently stores the given object.

14. The apparatus of claim 1, further comprising at least one replicated version of the metadata server associated with the virtual file system.

15. A processing platform comprising the apparatus of claim 1.

16. A method comprising:

configuring a virtual file system to provide an interface between a physical file system and a plurality of clients of a computer system, the virtual file system comprising a plurality of virtual file system components implemented on respective ones of a plurality of compute nodes associated with the plurality of clients;

associating a metadata server with the virtual file system, wherein the metadata server comprises a network file server external to the virtual file system and each of at least a subset of the plurality of compute nodes incorporates a network file server mount configured to allow each compute node of the subset to access metadata stored on the network file server;

in the virtual file system:
  receiving a plurality of files from each of one or more of the plurality of clients;
  arranging the received plurality of files into objects for object-based storage in a plurality of storage tiers of the physical file system; and
  controlling movement of the objects between the plurality of storage tiers of the physical file system; and in the metadata server:
  storing metadata information indicating, for each of the objects, a corresponding storage tier of the physical file system that currently stores the object;
  wherein the arranging of the files into objects comprises associating multiple ones of the received plurality of files with a single object of the virtual file system.

17. The method of claim 16, wherein the configuring of the virtual file system comprises configuring the virtual file system as a parallel log-structured file system (PLFS) comprising PLFS clients implemented on respective ones of the plurality of compute nodes and further wherein the arranging of the received plurality of files into objects comprises associating multiple ones of the received plurality of files with a single PLFS object.

18. An article of manufacture comprising a processor-readable storage medium having stored therein program code of one or more software programs, wherein the program code when executed on one or more processing platforms causes the method of claim 16 to be performed.

19. An information processing system comprising:
a computer system comprising a plurality of clients;
a cluster file system coupled to the computer system and comprising:
  a physical file system comprising a plurality of storage tiers;
  a virtual file system configured to provide an interface between the physical file system and the plurality of clients; and
  a metadata server associated with the virtual file system;
  the virtual file system comprising a plurality of virtual file system components implemented on respective ones of a plurality of compute nodes associated with the plurality of clients;

wherein the virtual file system receives a plurality of files from each of one or more of the plurality of clients and arranges the received plurality of files into objects for object-based storage in the plurality of storage tiers of the physical file system;

wherein the arranging of the files into objects comprises associating multiple ones of the received plurality of files with a single object of the virtual file system;

wherein the virtual file system controls movement of the objects between the plurality of storage tiers of the physical file system;

wherein the metadata server stores metadata information indicating, for each of the objects, a corresponding storage tier of the physical file system that currently stores the object; and wherein the metadata server comprises a network file server external to the virtual file system and each of at least a subset of the plurality of compute nodes incorporates a network file server mount configured to allow each compute node of the subset to access metadata stored on the network file server.

20. The system of claim 19, wherein the plurality of storage tiers of the physical file system comprises at least one burst buffer tier and at least one object storage server tier.

\* \* \* \* \*